United States Patent
Hansen et al.

(10) Patent No.: US 10,831,991 B1
(45) Date of Patent: Nov. 10, 2020

(54) SYSTEMS AND METHODS FOR TESTING CONTENT DEVELOPED FOR ACCESS VIA A NETWORK

(71) Applicant: United Services Automobile Association (USAA), San Antonio, TX (US)

(72) Inventors: Gregory David Hansen, Helotes, TX (US); Jerry John Maestas, San Antonio, TX (US)

(73) Assignee: United Service Automobile Association (USAA), San Antonio, TX (US)

( * ) Notice: Subject to any disclaimer, the term of this patent is extended or adjusted under 35 U.S.C. 154(b) by 235 days.

(21) Appl. No.: 15/169,265

(22) Filed: May 31, 2016

Related U.S. Application Data

(60) Provisional application No. 62/170,007, filed on Jun. 2, 2015.

(51) Int. Cl.
| | |
|---|---|
| *G06F 40/194* | (2020.01) |
| *G06F 40/14* | (2020.01) |
| *G06F 40/151* | (2020.01) |
| *G06T 7/00* | (2017.01) |

(52) U.S. Cl.
CPC ............ *G06F 40/194* (2020.01); *G06F 40/14* (2020.01); *G06F 40/151* (2020.01); *G06T 7/0002* (2013.01); *G06T 2207/30176* (2013.01)

(58) Field of Classification Search
CPC ........... G06F 17/30994; G06F 17/2211; G06F 17/2247; G06F 17/2264; G06F 40/194; G06F 40/151; G06F 40/14; G06T 7/0002
See application file for complete search history.

(56) References Cited

U.S. PATENT DOCUMENTS

| | | | |
|---|---|---|---|
| 7,110,454 B1* | 9/2006 | Chakraborty | G06K 9/00711 348/700 |
| 7,562,222 B2* | 7/2009 | Gasparini | H04L 63/0823 713/155 |
| 8,996,988 B2* | 3/2015 | Yee | G06F 16/9577 715/235 |
| 2006/0098899 A1* | 5/2006 | King | G06F 17/218 382/305 |
| 2006/0265593 A1* | 11/2006 | Momma | G06F 17/2725 713/176 |
| 2008/0250310 A1* | 10/2008 | Chen | G06F 17/2247 715/234 |
| 2010/0211893 A1* | 8/2010 | Fanning | G06F 16/958 715/760 |
| 2014/0105491 A1* | 4/2014 | Hayek | G06K 9/6202 382/165 |

* cited by examiner

*Primary Examiner* — Stephen S Hong
*Assistant Examiner* — Nicholas Hasty
(74) *Attorney, Agent, or Firm* — Fletcher Yoder, P.C.

(57) ABSTRACT

An electronic device may include a processor that may receive baseline image data that represents desired content to be displayed on a webpage. The processor may also receive online image data that may be accessible via a network. The online image data may include code that causes the processor to display a representation of the webpage on an electronic display. The processor may then identify one or more differences between the baseline image data and the online image data and generate one or more modifications to the code based on the differences.

20 Claims, 2 Drawing Sheets

SYSTEMS AND METHODS FOR TESTING CONTENT DEVELOPED FOR ACCESS VIA A NETWORK

CROSS REFERENCE TO RELATED APPLICATION

This application claims priority to and the benefit of U.S. Provisional Application No. 62/170,007, entitled "SYSTEMS AND METHODS FOR TESTING CONTENT DEVELOPED FOR ACCESS VIA A NETWORK" filed Jun. 2, 2015, which is hereby incorporated by reference in its entirety for all purposes.

BACKGROUND

The present disclosure relates generally to identifying differences between a desired image and an image rendered via an electronic device. More specifically, the present disclosure relates to verifying that image data published on a webpage is consistent with a desired image.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, an electronic device, includes a processor that operates to receive baseline image data that represents desired content to be displayed on a webpage. The processor also operates to receive online image data that is capable of being accessed via a network, wherein the online image data includes code that may display a representation of the webpage on an electronic display. Further, the processor may identify one or more differences between the baseline image data and the online image data and then generate one or more modifications to the code based on the differences.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When developing a webpage, a developer may first design the webpage by hand, using graphics designing software, and the like. In any case, the resulting design may be used as a baseline image that web page designers may use to generate a corresponding webpage. As such, web page designers may use the baseline image as a reference to generate code and images that may be combined to form a file that may be opened by a webpage browse application to display a corresponding webpage.

To ensure that the webpage published online sufficiently matches the baseline image data, a testing system may be employed to detect differences between the baseline image data and the corresponding published webpage. As will be discussed in greater detail below, in certain embodiments, a testing system may include a computing device that receives a digital version of the baseline image data and access to the webpage that corresponds to the baseline image data. After receiving these two images, the testing system may systematically compare various aspects of the data associated with each image to determine whether differences between the two images exist.

When a difference is identified, the testing system may populate a list of differences that may be provided to a user of the testing system. Additionally, the testing system may provide one or more suggestions with regard to how to adjust the webpage to better match the baseline image data. As such, in certain embodiments, the testing system may dynamically generate code (e.g., HyperText Markup Language (HTML) code) or modifications to HTML code used for the webpage, such that the new code may cause the webpage to better match the baseline image.

Figure 1:
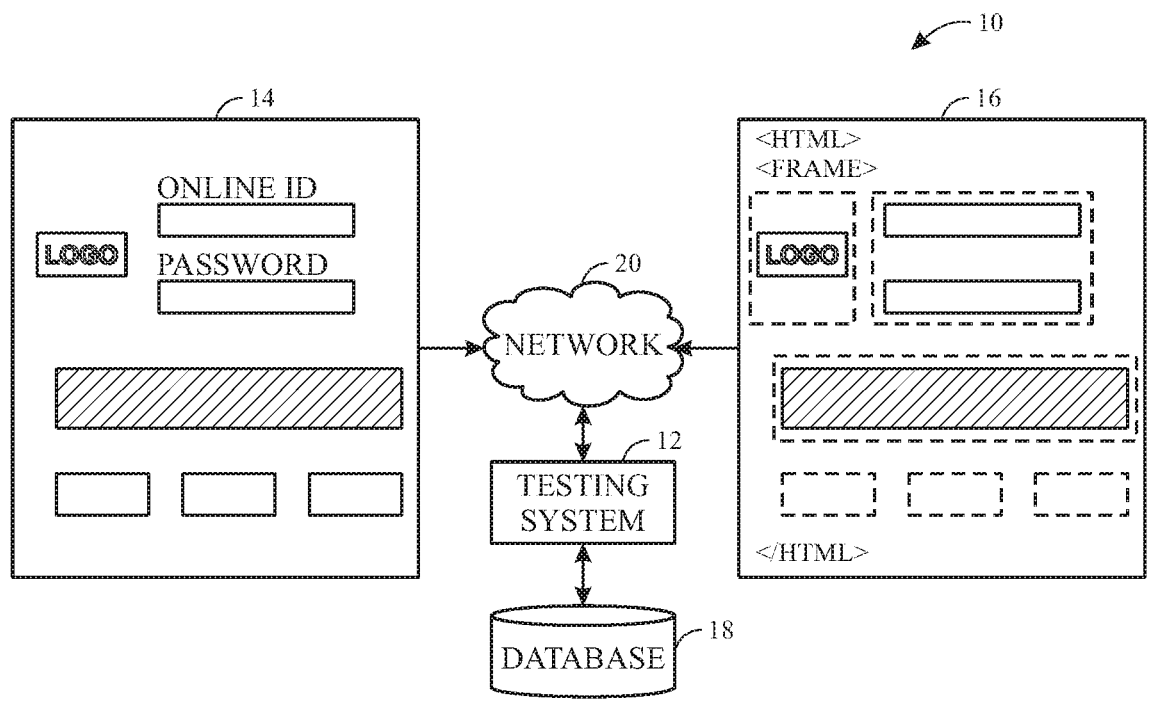
FIG. 1 illustrates a block diagram of a data comparator system, in accordance with embodiments described herein.

As discussed above, a testing system may compare data to, in effect, systematically compare a baseline image with an image generated by web browser or depicted online via the Internet or some other network. By way of introduction, FIG. 1 illustrates a block diagram of a data comparator system 10 that may employ a testing system 12 to compare baseline image data 14 and online image data 16. Generally, the testing system 12 may include any computing device such as a general-purpose computer, a mobile computing device, a laptop-computing device, a tablet computing device, a wearable computing device, and the like, which is specifically programmed and which may include imaging hardware, in accordance with present embodiments. Additional details with regard to the testing system 12 will be discussed below with reference to FIG. 2.

The baseline image data 14 may include an image generated by a designer or the like using graphics software tools or by hand. If the baseline image 14 is generated by graphics software, the baseline image 14 may be saved in a common image file format such as a Portable Document Format (PDF) file, a Joint Photographic Experts Group (JPEG) file, a Tagged Image File Format (TIF) file, a Graphics Interchange Format (GIF) file, or the like. In some embodiments, aspects of the baseline image data 14 may be translated into code that corresponds to a web application based on an algorithm (e.g., tables of empirical data) for comparison purposes.

In certain embodiments, the baseline image 14 may include metadata regarding various objects or visualizations depicted in the baseline image 14. For instance, a number of objects may be grouped together by the designer using the graphics software. As such, the number of objects may maintain a certain distance from each other as specified by the grouping. The distance between each object may be stored as part of the metadata for the grouped objects. In another example, the metadata may store a color associated with an object, such as a fill of a shape or a line bordering a shape. In the same manner, the metadata may include information regarding a point size of the line bordering the shape.

The online image data 16 may correspond to an image depicted on an electronic display. The online image data 16 may be coded or generated by web developers or the like based on the baseline image 14. That is, the developers may generate, for example, HTML code that, when rendered by an online browser application, depicts an image that matches the baseline image 14.

As will be appreciated, generating code to depict the baseline image 14 via an electronic display can be a difficult task. The process for translating various aspects of the baseline image 14 into code language that depicts the content of the baseline image 14 via an electronic display in a manner that is the same or substantially similar to the manner in which the baseline image 14 depicts the same content is challenging. As such, after an initial version of the online image data 16 is created by a developer, comparisons between the online image data 16 and the baseline image 14 may assist the developer to identify items in the online image data 16 that do not match or substantially match the same items in the baseline image 14.

With this in mind, the testing system 12 may be used to efficiently identify the differences between the baseline image 14 and the online image data 16. That is, the testing system 12 may receive the baseline image 14 and the online image data 16 as inputs and identify differences between the two images. In certain embodiments, the testing system 12 may provide a list of the differences to a user of the testing system 12. The testing system 12 may also generate suggested modifications to code used to generate the online image data 16, such that the modifications may cause the online image data 16 to more accurately match the baseline image 14.

After analyzing the differences between the baseline image 14 and the online image data 16, the testing system 12 may store the results of its analysis on a database 18. In addition, the baseline image 14 may also be stored on the database 18, such that it may be accessed by the testing system 12 to verify that some published webpage accurately matches a corresponding baseline image 14. As such, in certain embodiments, the testing system 12 may be communicatively coupled to a network 20, which may be communicatively coupled to a number of other computing devices.

Figure 2:
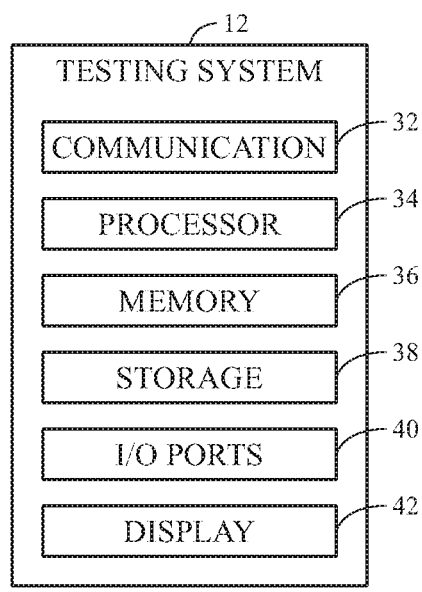
FIG. 2 illustrates a block diagram of a testing system employed by the data comparator system of FIG. 1, in accordance with embodiments described herein.

To perform some of the actions set forth above, the testing system 12 may include certain components to facilitate these actions. FIG. 2 is a block diagram of example components within the testing system 12. For example, the testing system 12 may include a communication component 32, a processor 34, a memory 36, a storage 38, input/output (I/O) ports 40, a display 42, and the like. The communication component 32 may be a wireless or wired communication component that may facilitate communication between the testing system 12, the network 20, and other communication capable devices.

The processor 34 may be any type of computer processor or microprocessor capable of executing computer-executable code that is specifically programmed in accordance with present embodiments. The processor 34 may also include multiple processors that may perform the operations described below.

The memory 36 and the storage 38 may be any suitable articles of manufacture that can serve as media to store processor-executable code, data, or the like. These articles of manufacture may represent computer-readable media (e.g., any suitable form of memory or storage) that may store the processor-executable code used by the processor 34 to perform the presently disclosed techniques. The memory 36 and the storage 38 may also be used to store the data (e.g., baseline image 14, online image data 16), analysis of a comparison of the baseline image 14 and the online image data 16, various other software applications, and the like. The memory 36 and the storage 38 may represent non-transitory computer-readable media (e.g., any suitable form of memory or storage) that may store the processor-executable code used by the processor 34 to perform various techniques described herein. It should be noted that non-transitory merely indicates that the media is tangible and not a signal.

The I/O ports 40 may be interfaces that may couple to other peripheral components such as input devices (e.g., keyboard, mouse), sensors, input/output (I/O) modules, and the like.

The display 42 may operate to depict visualizations associated with software or executable code being processed by the processor 34. In one embodiment, the display 42 may be a touch display capable of receiving inputs from a user of the testing system 12. The display 42 may be any suitable type of display, such as a liquid crystal display (LCD), plasma display, or an organic light emitting diode (OLED) display, for example. Additionally, in one embodiment, the display 42 may be provided in conjunction with a touch-sensitive mechanism (e.g., a touch screen) that may function as part of a control interface for the testing system 12.

In one embodiment, the display 42 may be used to depict the online image data 16 when comparing the baseline image 14 and the online image data 16. As such, the comparison between these two images may be different based on a type of the display 42 used to depict the online image data 16. In certain embodiments, the testing system 12 may adjust an aspect ratio of the online image data 16 based on the aspect ratio of the display 42. Alternatively, the testing system 12 may analyze the differences between the baseline image 14 and the online image data 16 according to various aspect ratios associated with different types of displays and display sizes.

Figure 3:
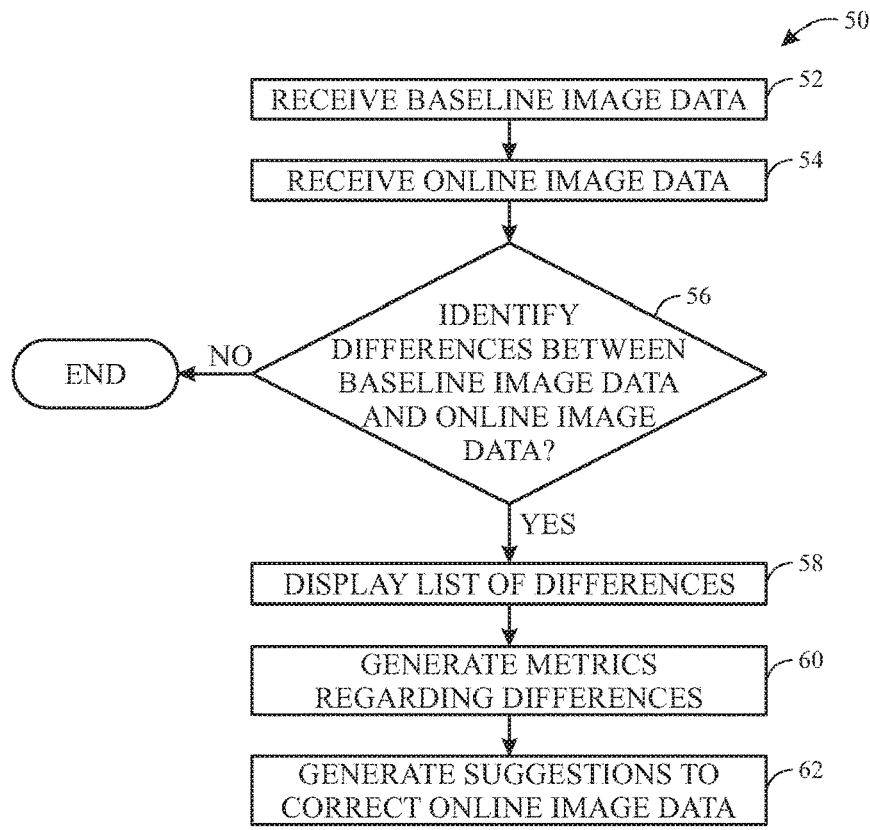
FIG. 3 illustrates a flow chart of a method for comparing baseline image data and online image data, in accordance with embodiments described herein.

Keeping this in mind, FIG. 3 illustrates a flow chart of a method 50 employed by the testing system 12 for comparing the baseline image 14 and the online image data 16. Although the following description of the method 50 is described in a particular order, it should be noted that the method 50 is not limited to the depicted order; and, instead, the method 50 may be performed in any suitable order.

Referring now to FIG. 3, at block 52 and block 54, the testing system 12 may receive the baseline image 14 and the online image data 16. As discussed above, the baseline image 14 may be a digital file or digital representation of an original image generated by a designer to be displayed as a webpage. The online image data 16 may include a file or data that may be opened and depicted on a browser application that is generally used to access webpages and websites published online. In one embodiment, after receiving the baseline image 14, the testing system 12 may code out or automatically generate code (e.g., HTML code) that may be opened or accessed via a browser application or the like. In one embodiment, the testing system 12 may receive the online image data 16 via a separate software application or computing device that generated the online image data 16.

At block 56, the testing system 12 may identify differences between the baseline image 14 and the online image data 16. It should be noted that this is done without necessarily generating or displaying actual images. Rather, the code associated with the online image data 16 may be compared with data associated with the baseline image 14 (e.g., pixel data or automatically associated code). However, to facilitate discussion, reference is made herein to displaying and depicting the related images. It should be understood that this includes analyzing the data as it is intended to be displayed or would be displayed with certain aspect ratios and so forth but without actually providing the image on a display.

In one embodiment, to identify differences between the two images, the testing system 12 may first display or depict the online image data 16 in a same or substantially similar aspect ratio as the baseline image 14. As previously noted, actual display may not be performed but analysis of the data as it would be displayed in the relevant aspect ratio may be performed. In this way, dimensions and spacing between objects depicted in the baseline image 14 and the online image data 16 may be compared accurately.

After the online image data 16 is depicted (e.g., assembled for actual depiction) in the same manner as the baseline image 14, there are a number of ways in which the testing system 12 may identify the differences between these two images. In one example, the testing system 12 may slice the baseline image 14 and the online image data 16 into a number of portions. After splicing the images, the testing system 12 may compare each sliced portion with each other. In certain embodiments, the baseline image 14 may include predefined sliced portions that make up different sections of the depicted content. The sliced portion of an image may be created when the image is initially designed using graphics software or the like. As such, the sliced portion of an image may include a grouping of images that is considered to be part of the same object. For example, a logo portion (e.g., graphical element) of an image may be sliced as a separate portion of the image data that includes images that depict a logo and artistic text that conveys a company name. As such, in certain embodiments, since these sliced portions are created by designers when generating the baseline image 14, the testing system 12 may identify these sliced portions when comparing the baseline image 14 and the online image data 16 to efficiently compare these images.

When identifying differences between the sliced portions, the testing system 12 may analyze a color of different sections of the sliced portion, height/width ratios of objects (e.g., text object, image object) depicted in the sliced portion, metadata available in the sliced portion, and the like. In one embodiment, the metadata may be related to a grouping of objects, as mentioned above, or to text depicted in the sliced portion. The metadata regarding the text may include information regarding a font type for the text, a font size for the text, a color of the text, effects (e.g., italics, bold) of the text, a typeface of the text, and the like.

To analyze the metadata, the testing system 12 may analyze the files for the baseline image 14 and the online image data 16 and identify any metadata stored thereon. After identifying the metadata, the testing system 12 may compare the information stored within the metadata of each file and verify that the information is the same.

To accommodate for various window sizes in which the online image data 16 may be depicted on the display 42, the testing system 12 may compare pixel counts or height/weight percentage values with regard to the entire depicted image. For example, if a banner depicted on the baseline image 14 encompasses 50% of the width of the entire baseline image 14, the testing system 12 may verify that the same banner depicted in the online image data 16 also encompasses 50% of the window in which the online image data 16 is displayed. By comparing the height and width percentages of objects depicted in the baseline image 14 and the online image data 16, the testing system 12 may better identify differences between the two images regardless of the display 42 employed or a size of window in which the online image data 16 is depicted.

In some embodiments, the testing system 12 may perform a pixel-to-pixel comparison between the baseline image 14 and the online image data 16. As such, the testing system 12 may determine a color value and a brightness value for each pixel depicted in the online image data 16 and compare the values to a corresponding part of the baseline image 14. Additionally, the testing system 12 may determine a number of pixels that an object depicted on the baseline image 14 includes and compare this number to a number of pixels used in depicting the same object on the online image data 16.

Although the baseline image 14 has been described as a static or single image, in some cases, the baseline image 14 may include multiple images that correspond to an animation that is to be depicted on a webpage or the like. In this case, the testing system 12 may perform block 56 using the multiple images that make up the baseline image 14 and a number of instances of the online image data 16 that correspond to the still images that illustrate various points in time with respect to the animation. In some embodiments, certain slices or sections of the online image data 16 may be excluded from the comparison function since it may be difficult to accurately identify differences between animated objects depicted in the baseline image 14 and the online image data 16.

Keeping the foregoing in mind, the testing system 12 may compare movement depicted on one image using keyframing, whereby the first frame and last frame image's elements are identified by use of coordinates. The testing system 12 may then track the motion tracking between the first keyframe and last keyframe to determine whether an appropriate path or sequence was followed. To analyze the movement across multiple images, the testing system 12 may handle multiple image comparisons using metadata and file structure/image names. That is, the testing system 12 may analyze a sequence, duration, and placement of all associated images identified in a source file of either the code or the initial comparison upload process.

Additionally, the baseline image 14 received at block 52 may be designed for a particular type of display 42. That is, the baseline image 14 may be designed to be depicted on a display 42 of a general-purpose computer, a mobile device, or a tablet device. As such, when identifying differences between the baseline image 14 and the online image data 16, the testing system 12 may determine whether the baseline image 14 corresponds to the display 42 of the testing system 12. If the baseline image 14 does not correspond to the display 42, the testing system 12 may retrieve another baseline image from the database 18 that corresponds to the appropriate display 42. In one embodiment, the testing system 12 may adjust the baseline image 14 to match the dimensions of the display 42 before identifying the differences between the two images. In the same manner, the testing system 12 may retrieve a related baseline image 14 from the database 18 or adjust the baseline image 14, as described above, based on a browser application being used to depict the online image data 16. As noted above, actual display of images is not required and present embodiments may operate to perform numerous comparisons in series or simultaneously based on established templates for display types.

In certain embodiments, when analyzing the baseline image 14 and the online image data 16 at block 56, the testing system 12 may perform the analysis of block 56 with respect to being depicted on multiple different browser applications and versions of such. That is, since different browser applications may render images differently, the testing system 12 may perform the analysis of block 56 on various browser applications and versions of such to ensure that the baseline image 14 is accurately depicted across various platforms.

When analyzing text portions of the baseline image 14 and the online image data 16, metadata regarding the text portions of each image may not be available for use by the testing system 12. In this instance, the testing system 12 may use an optical character reader to identify a type of font, a size of font, a typeface of the text, and other properties regarding the text that may be compared between the two images.

In addition to detecting differences between the baseline image 14 and the online image data 16 using comparison techniques, the testing system 12 may also have access to a library of profiles (e.g., via database 18). Each profile may specify sizes used for logo images, banners, buttons, and other content that may be depicted on the baseline image 14. The testing system 12 may then analyze various slices or objects in the online image data 16 with respect to the corresponding profile.

With this in mind, the profile may include information regarding a predetermined set of colors employed in the design of the baseline image 14. That is, certain organizations may predefine the colors that they employ on webpages to a distinct set of colors, which may be used by the baseline image 14. As such, the testing system 12 may analyze the online image data 16 with regard to the predetermined set of colors to identify potential differences between the baseline image 14 and the online image data 16. Colors not within predefined ranges of hue, brightness, and so forth may be automatically adjusted to approved values.

In the same fashion, the profile may also include information regarding a predetermined set of patterns or spacing specifications. Here, a certain set of rules or spacing specifications may be predetermined with regard to patterns depicted on any image designed for an organization. For instance, a minimum distance between interactive buttons and other objects depicted on an image may be predefined. As such, the testing system 12 may analyze the online image data 16 with regard to the predetermined set of patterns or spacing specifications to identify potential differences between the baseline image 14 and the online image data 16.

In certain embodiments, before identifying the differences between the baseline image 14 and the online image data 16, the testing system 12 may receive an input from the user indicating various portions of the baseline image 14 or of the online image data 16 that are to be excluded from the analysis performed at block 56. That is, certain areas of the baseline image 14 may include variable content, such as animation, scrolling images, and the like, which would make the comparison analysis more challenging to implement.

Referring back to FIG. 3, after identifying the differences between the baseline image 14 and the online image data 16, the testing system 12 may proceed to block 58. At block 58, the testing system 12 may display a list of the identified differences to the user of the testing system 12. The list may also include information regarding which slices or portions of the online image data 16 included the identified differences. The list may also include references to relevant sections of code used to generate the online image data 16 that correspond to the areas of the baseline image 14 where differences have been identified. In some embodiments, a graphical report may be provided which displays differences or proposed changes. For example, differences of proposed changes may be preselected in a ghosted or dashed line format as an overlay over the existing image.

Additionally, at block 60, the testing system 12 may generate metrics or metric measurements regarding the identified differences. The metrics may include a percentage value that corresponds to how well the online image data 16 matches the baseline image. The metrics may also include information regarding a percentage value for how well each slice or portion of the online image data 16 matched the corresponding slice or portion of the baseline image 14. In a graphic representation, percentage differences may be indicated as corresponding to regions of an image.

In addition to generating metrics regarding variances (e.g., percentage variance) between the baseline image 14 and the online image data 16, at block 62, the testing system 12 may generate one or more suggestions with regard to how to correct or modify the online image data 16 to better match the baseline image 14. For example, if the metadata from a particular slice of the baseline image 14 indicated a 12-point font for the text in the particular slice and corresponding metadata in the online image data 16 indicated a different size font, the testing system 12 may suggest that the font size code for the respective slice of the online image data 16 is changes to 12-point.

After performing the method 50 for a baseline image 14, in certain embodiments, the testing system 12 may perform the method 50 again for each webpage of a group of webpages that may be available via a website. As such, the testing system 12 may systematically navigate to each webpage of the website and compare the respective baseline image 14 with the respective online image 16 of each webpage to ensure that the group of webpages associated with the website are each depicted accurately.

Although the method 50 has been described as being performed on a testing system 12 or a specific computing device, in one embodiment, the method 50 may be performed by a software application used to develop or code HTML files, such as webpages. As such, the method 50 may be performed by an add-on or plug-in component that operates in conjunction with the software used to develop or code the HTML file. In this manner, the computer-executable instructions performed by the testing system 12 described above may also be employed by a plug-in component for software used to design or create the baseline image 14. In this case, the plug-in component may obtain the slice information, metadata, and the like regarding the baseline image 14 directly from the software used to generate the baseline image 14.

In certain embodiments, the testing system 12 may be part of a software application used to generate the online image data 16. As such, after a code or a portion of the code used to generate the online image data 16 is altered, the testing system 12 may automatically compare the modified online image data 16 with the baseline image 14 as described above. Additionally, the software application may provide for various triggers to initiate the testing process described in the method 50. That is, the software application may initiate the testing system 12 after receiving certain inputs. For example, if the generated code is checked into a repository, the software application may automatically trigger the testing system 12 to perform the method 50.

It should be noted that the systems and techniques described herein should not be limited to being performed on two-dimensional images. Instead, the testing system 12 may also identify differences between baseline images 14 and corresponding online image data 16 for three-dimensional image content. As such, the testing system 12 may have baseline images 14 for three-dimensional, virtual reality, and augmented reality designs. In one embodiment, the testing system 12 may identify differences between these types of baseline images 14 and the corresponding online image data 16 using vanishing point technologies along with keyframing, algorithm tie-ins to allow the capability to test additional interfaces (e.g., glass displays or holograms).

Figure 4:
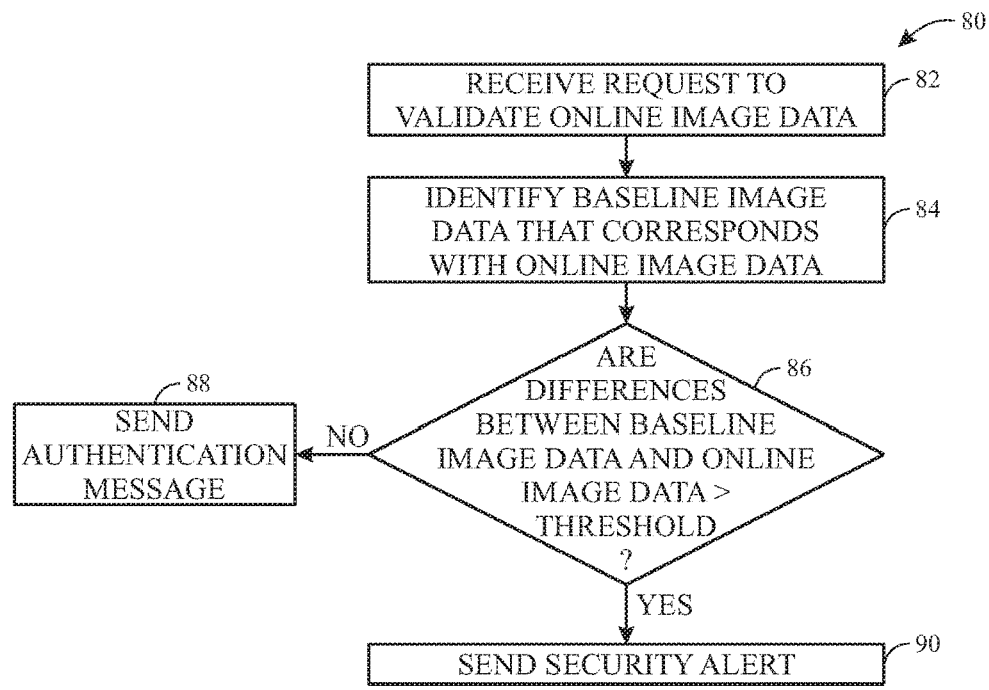
FIG. 4 illustrates a flow chart of a method for authenticating a webpage, in accordance with embodiments described herein.

In addition to detecting differences between the baseline image 14 and the online image data 16 after the baseline image 14 is designed, the testing system 12 may also determine the authenticity of a webpage. For example, FIG. 4 illustrates a flow chart of a method 80 for authenticating a webpage being accessed by an individual. The following description of the method 80 is described as being performed by the testing system 12, but it should be noted that the method 80 may be performed by any suitable computing device that is capable of executing computer-readable instructions for implementing the method 80.

Generally, the method 80 provides a user an ability to determine or test the authenticity of a webpage accessed over a network (e.g., the Internet). In certain embodiments, the method 80 may be initiated by the user opening a separate application or via a plug-in application for the browser application accessing the webpage. In any case, after initiating the authentication process, the application may compare the online image data 16 depicted on the accessed webpage to baseline image data 14 that corresponds to the webpage. In this way, the user may be sure to be accessing the correct webpage he desires to access, as opposed to an imposter or a webpage attempted to defraud the user. Thus, present embodiments facilitate improved operation of computer-based devices accessing webpages and the like.

With this in mind and referring to FIG. 4, at block 82, the testing system 12 may receive a request to validate or authenticate the online image data depicted on a webpage. At block 84, the testing system 12 may then identify baseline image data 14 that corresponds to the online image data. As such, in one embodiment, the testing system 12 may query the database 18 to identify the baseline image data 14 used to generate the online image data. The query may use the URL (Uniform Resource Identifier) address of the accessed webpage as an index to the database 18. Alternatively, the testing system 12 may scan the online image data and determine baseline image data 14 that most closely resembles the online image data. The testing system 12 may acquire related metadata as a component of this process and subsequently use the metadata for comparison and confirmation.

After identifying the baseline image data 14 that corresponds to the online image data, at block 86, the testing system 12 may determine whether differences between the online image data and the identified baseline image data 14 is greater than a threshold. The differences between the two images may be determined using one or more of the procedures described above with respect to FIG. 3.

If the differences between the two images are not greater than the threshold, the testing system 12 may proceed to block 88 and send an authentication message. The authentication message may indicate that the webpage is likely from an authorized source and recommend that the user proceed with his request.

If, however, the differences between the two images are greater than the threshold, the testing system 12 may proceed to block 90 and send a security alert message to the user. The security alert message may indicate that the accessed webpage may not be from an authorized website or authorized by an organization represented by the webpage. In addition to sending the security alert message to the user, the testing system 12 may also send the security alert message to the organization being misrepresented by the fraudulent webpage. That is, the security message may be sent to stakeholders of the organization via email, text message, or the like.

In addition to the security features mentioned above, the testing system 12 may be used at any time to determine whether the published webpage is up to date with respect to the baseline image data 14 that it is to represent. As such, each webpage may be periodically tested by the testing system 12 to verify that the published webpages are up to date. That is, the testing system 12 may periodically access a webpage, gather the corresponding online image 16 of the webpage, and compare the online image 16 to a respective baseline image data 14 to determine whether the online image 16 represents the most up to date baseline image data 14 designed for the respective webpage.

The ability of the testing system 12 to compare online images 16 with baseline image data 14 provide improved efficiencies in verifying that the online image 16 accurately portrays the desired baseline image data 14. However, in addition to the improved efficiencies and security features discussed above, the testing system 12 may acquire online image data at various instances during which a user is interacting with a webpage. In other words, the testing system 12 may acquire screen shots or images of the online image data depicted on the display of the computing device accessing the webpage. In one embodiment, the captured images may be compared to the corresponding baseline image data 14 and to each other to determine how the user is interacting with the webpage.

For example, if a chat box is depicted on the corresponding baseline image data 14 for the webpage and is closed in the online image 16, the testing system 12 may determine that the user does not intend to chat with a representative. As data regarding how the user interacts with the webpage is gathered over time, the testing system 12 may adjust the webpage based on user preferences as determined by the manner in which the user interacts with the webpage. For example, the testing system 12 may specify that the respective user's webpage not include the chat window.

Additionally, by continuously acquiring images of the online image 16, the testing system 12 may capture inputs entered by the user on webpages requesting form information. These images may be used in an instance when the user loses access to the webpage or experiences a power outage to reproduce the inputs entered by the user. As such, when the user loses information or inputs entered into various fields of a form depicted on a webpage, the testing system 12 may recall an image captured before the inputs were lost and reenter them into the newly loaded webpage.

Another advantage of continuously acquiring images of the online image 16 includes determining whether a webpage depicting the online image 16 is operating at desired speeds. For instance, the testing system 12 may compare different images of the online image 16 related to before and after a request has been input by the user to determine whether the webpage has changed as expected within an expected amount of time. As such, the testing system 12 may acquire an image before the request was input and another image after a certain amount of time has passed from receiving the request. If the images indicate that the webpage has not changed as expected, the testing system 12 may determine that the user is operating the webpage using a slow bandwidth connection, without an appropriate driver, or the like. Upon detecting these items, the testing system 12 may adjust the online image 16 depicted on the webpage to better suit the user's computing device.

The testing system 12 may also use the acquired images of the online image 16 as a way to share a screen shot with a representative of the webpage. For example, when troubleshooting issues on how to use a webpage or web application, a technician or support personnel associated with an organization that publishes the webpage or web application may be available to work with a user to resolve the user's issues. In certain embodiments, the technician may request that the user share access to his computing device so that the technician can better understand the issue. In this case, the computing device of the user may send a video feed of the online image 16 depicted on the display of the computing device. Sending video feeds, however, involves large amounts of bandwidth and may not be a viable option for users with low-bandwidth connection to a network.

With this in mind, instead of sending a video feed of the online image 16, the testing system 12 may send the online image 16 acquired at various times in which the user is interacting with the webpage. The acquired online images 16 may be still shots or screen captures that use significantly less bandwidth when being transmitted as compared to a video feed. As such, the technician may request that the testing system 12 send acquired online images 16 while the user is interacting with the webpage based on the instructions of the technician. In this way, the technician may be aware of how the user is interacting with the webpage and how the webpage reacts to these interactions without transmitting full video feeds of the user's interaction with the webpage.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. An electronic device, comprising:
at least one processor configured to:
receive online image data associated with an organization, wherein the online image data is configured to be accessible via a network, wherein the online image data comprises code configured to cause a network browser application to display a webpage on an electronic display;
receive baseline image data that corresponds to originally designed content to be displayed on the webpage associated with the online image data, wherein the baseline image data corresponds to an image file format generated using graphics software and depicts an image of the webpage, and wherein the baseline image data is received via a database associated with the organization;
identify one or more differences between the baseline image data and the online image data, wherein one of the one or more differences comprises a difference between a position of an object in the baseline image data and a corresponding position of a corresponding object in the webpage generated by the network browser application based on the online image data; and
generate one or more modifications to the code based on the one or more differences, wherein the one or more modifications are configured to correct for the one or more differences between the baseline image data and the online image data.

2. The electronic device of claim 1, wherein the one or more differences between the baseline image data and the online image data are identified by analyzing one or more slices of the baseline image data with respect to one or more corresponding slices of the online image data.

3. The electronic device of claim 1, wherein the at least one processor is configured to generate one or more metric measurements regarding the one or more differences, wherein the one or more metric measurements comprise a percentage variance between a first set of metadata associated with the baseline image data and a second set of metadata associated with the online image data.

4. The electronic device of claim 3, wherein the at least one processor is configured to send a security alert to a user when the percentage variance exceeds a threshold.

5. The electronic device of claim 1, wherein the at least one processor is configured to identify the one or more differences by:
displaying the baseline image data and the online image data in substantially similar aspect ratios;
slicing the baseline image data into a first plurality of portions;
slicing the online image data into a second plurality of portions, wherein each of the first plurality of portions and each of the second plurality of portions are approximately equal to each other; and
analyzing each of the first plurality of portions with a respective portion of the second plurality of portions to identify the one or more differences.

6. The electronic device of claim 5, wherein the one or more differences comprise one or more color properties, one or more height to width ratios, or any combination thereof.

7. The electronic device of claim 3, wherein the first set of metadata comprises information regarding a font type for text, a font size for the text, a color of the text, one or more effects of the text, a typeface of the text, or any combination thereof.

8. The electronic device of claim 5, wherein at least one of the first plurality of portions comprise a group of image components that are part of a single object, a logo graphical element, or a text object.

9. A method, comprising:
receiving, via at least one processor, online image data associated with an organization, wherein the online image data is configured to be accessible via a network, wherein the online image data comprises code configured to cause a network browser application to display a webpage on an electronic display;
receiving, via the at least one processor, baseline image data that depicts a design that corresponds to the webpage associated with the online image data, wherein the baseline image data corresponds to an image file format generated using graphics software and depicts an image of the webpage, and wherein the baseline image data is received via a database associated with the organization;
identifying, via the at least one processor, one or more differences between the baseline image data and the online image data, wherein one of the one or more differences comprises a first amount of spacing between two objects in the baseline image data as compared to a second amount of spacing between two corresponding objects in the webpage generated by the network browser application based on the online image data;
generating, via the at least one processor, a list of the one or more identified differences; and
rendering, via the at least one processor, a visualization comprising the list of the one or more identified differences on the electronic display, wherein the list of the one or more identified differences comprises one or more references to one or more sections of the code that corresponds to the one or more identified differences; and
generating one or more modifications to the one or more sections of the code that corresponds to the one or more identified differences to compensate for the one or more identified differences, wherein the one or more modifications are configured to correct for the one or more identified differences between the baseline image data and the online image data.

10. The method of claim 9, wherein the baseline image data comprises a plurality of images depicting an animation effect.

11. The method of claim 10, comprising identifying, via the at least one processor, the one or more differences between the plurality of images and a corresponding plurality of images of the online image data based on keyframing.

12. The method of claim 11, wherein identifying the one or more differences based on keyframing comprises:
analyzing, via the at least one processor, a movement of a first object depicted on a first image of the plurality of images to a second image of the plurality of images; and
comparing, via the at least one processor, the movement to a path of movement depicted on a plurality of frames of the online image data for a second object representative of the first object.

13. The method of claim 9, wherein identifying the one or more differences comprises:

determining, via the at least one processor, a type of the electronic display configured to communicate with the processor;
retrieving, via the at least one processor, a second baseline image data based on the type of the electronic device; and
comparing, via the at least one processor, the online image data with the second baseline image data.

14. A non-transitory computer-readable medium comprising computer-executable instructions configured to cause at least one processor to:
receive a request to validate online image data depicted on a browser application, wherein the online image data is associated with an organization, and wherein the online image data comprises code configured to cause the browser application to display a webpage on an electronic display;
retrieve baseline image data that corresponds to the online image data, wherein the baseline image data corresponds to an image file format generated using graphics software and depicts an image of the webpage, and wherein the baseline image data is retrieved via a database associated with the organization;
identify one or more differences between the baseline image data and the online image data, wherein one of the one or more differences comprises a difference between a first height and width ratio of an object in the baseline image data as compared to a second height and width ratio of a corresponding object in the webpage generated by the network browser application based on the online image data; and
send an authentication message to the browser application in response to a number of the one or more identified differences being less than a threshold.

15. The non-transitory computer-readable medium of claim 14, wherein the computer-executable instructions are configured to cause the at least one processor to retrieve the baseline image data by identifying the baseline image data employed to create the online image data based on a Uniform Resource Identifier (URL) address associated with the online image data, a scan of the online image data, metadata associated with the online image data, or any combination thereof.

16. The non-transitory computer-readable medium of claim 14, wherein the computer-executable instructions are configured to cause the at least one processor to send an alert to the browser application in response to the number of the one or more differences being greater than the threshold.

17. The non-transitory computer-readable medium of claim 14, wherein the computer-executable instructions are configured to cause the at least one processor to send an alert to an organization associated with the online image data in response to the number of the one or more differences being greater than the threshold.

18. The non-transitory computer-readable medium of claim 14, wherein the computer-executable instructions are configured to cause the at least one processor to correlate the one or more differences with one or more parts of the code.

19. The non-transitory computer-readable medium of claim 14, wherein the authentication message comprises information indicating that the online image data is from an authorized website.

20. The electronic device of claim 3, wherein the first set of metadata and the second set of metadata comprise a number of one or more objects grouped together, a distance between the one or more objects, one or more colors of the one or more objects, a point size of a line bordering one of the one or more objects, or any combination thereof.

* * * * *